246. RAILWAY SWITCHES
AND SIGNALS.
4 1 4

Examiner

Aug. 14, 1945. J. V. HOUSTON ET AL Re. 22,663

RAILWAY CROSSING Orig. 2346,377

Original Filed Feb. 18, 1943 2 Sheets-Sheet 1

INVENTORS
JOHN V. HOUSTON,
BERGER R. HABEL
BY
Austin, Willson & Carlson
ATTORNEYS

5

Aug. 14, 1945. J. V. HOUSTON ET AL Re. 22,663

RAILWAY CROSSING

Original Filed Feb. 18, 1943 2 Sheets-Sheet 2

INVENTORS
JOHN V. HOUSTON,
BERGER R. HABEL

BY Austin, Willson & Carlson
ATTORNEYS

RAILWAY SWITCHES
AND CROSSINGS
164

Search Room

Reissued Aug. 14, 1945

Re. 22,663

UNITED STATES PATENT OFFICE 22,663

RAILWAY CROSSING

John V. Houston, Hartsdale, N. Y., and Berger R. Habel, La Grange, Ill., assignors to American Brake Shoe Company, a corporation of Delaware Original No. 2,346,377, dated April 11, 1944, Serial No. 476,280, February 18, 1943. Application for reissue April 6, 1945, Serial No. 586,836

16 Claims. (Cl. 246—464)

The present invention relates to railway crossings and more particularly to railway crossings of the box type.

Among the objects of the present invention is to provide a railway crossing of the box type in which the base, the wall members upstanding from said base, and the horizontal web portion bridging the spaces between the wall members and providing intersecting flangeways and tread surfaces, are all formed in one integral casting designed appropriately for optimum foundry practice and uniform heat treatment that is resorted to for developing a desired structure in the metal, for instance, when manganese steel is used.

Another object of the present invention is to provide a railway crossing of the box type in which the base is of continuous construction except for the provision of openings necessary for the removal of core forming material from the inside of the box structure and to provide for quenching and other necessary heat treatment; thus assuring proper load distribution at the crossing intersection.

Still a further object of the present invention is to provide a railway crossing of the box type in which upstanding walls are provided at desired locations within the box structure which act as load sustaining columns serving as substantial continuations of the webs of adjacent running rails and to distribute wheel loads over the entire base and to the supporting ties.

More particularly the present invention is directed to railway crossing structures of the box type in which the load sustaining webs or columns are disposed in interconnecting relation to the outer walls forming the box structure, and which in themselves form box structures within the box formation defining the crossing structure.

As a further desideratum of the invention, such load sustaining columns or webs are disposed in substantial parallel relation at or adjacent the tread surfaces defined by the flangeways developed in the bridging web forming the top portion of the crossing structure.

The invention more particularly involves a novel construction for a railway crossing structure in which the load sustaining columns or webs of diagonally opposed crossing corners developed by the said flangeways are disposed to reinforce the ribs forming said flangeways adjacent the tread surfaces of said crossing corners, and in which the crossing structure is further developed by having the load sustaining columns or webs of other diagonally opposed crossing corners developed by said flangeways in spaced relation to the said crossing corners.

The present structure further comprehends an arrangement for the said other diagonally opposed crossing corners, as immediately above identified, arranged to be disposed in a position substantially beneath the tread surface of one of the said flangeways of the adjacent crossing branches and to be disposed in spaced relation to the ribs of the flangeways of the other adjacent crossing branches.

As a further object, the railway crossing according to the immediately above described structure, may incorporate in spaced relation to the said load sustaining walls, additional load sustaining walls or columns spaced therefrom and disposed at the crossing corners developed by the said flangeways.

The present invention further contemplates an integral casting adapted to form a railway crossing which is of box-like construction provided with a continuous base throughout the casting, and which extends beyond the top and upstanding webs forming certain of the crossing branches to provide supporting means for the external rails connected to said branch crossings.

Still another object of the present invention is to provide a crossing structure as immediately above described, in which the extending bases for the crossing branches are of such a design as to insure good bearing relation with the supporting ties and distribution of the traffic impacts throughout the entire crossing structure.

As a further object of the invention the crossing herein contemplated, with its extending base portions for the crossing branches, provides for suitable bearing relation with the external rails to prevent the base of these rails from cutting into the ties at the joint.

A still further object of the present invention is to provide a railway crossing of box-like construction so formed as to facilitate connection of the same to external rails or other railway crossings by way of splice bars having wedging relation with their cooperating elements to assure that joints between the said elements can be kept tight by simple maintenance procedures.

Other objects, features, capabilities and advantages are comprehended by the invention, as will later appear and as are inherently possessed thereby.

Referring to the drawings—

Figure 1:
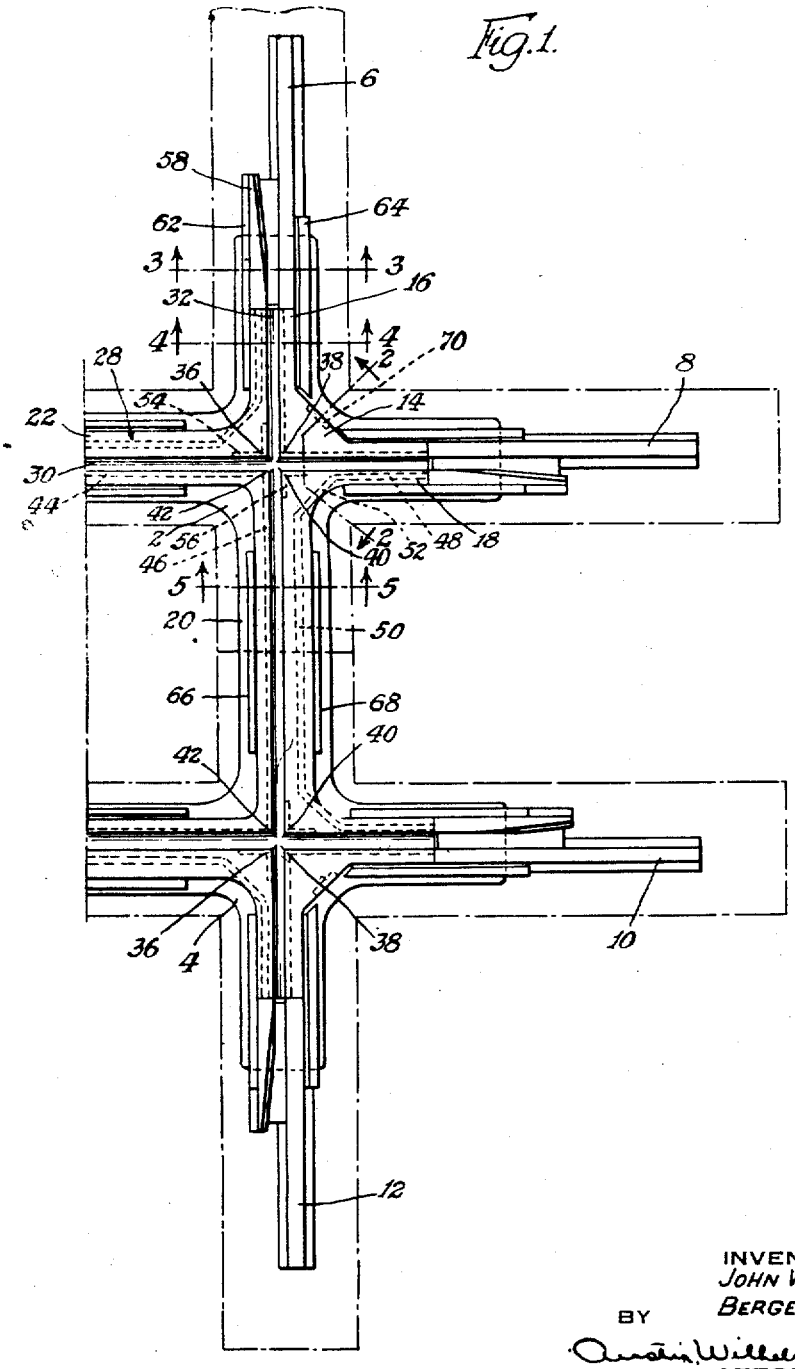
Fig. 1 is a top plan view of a part of a crossing assembly, including railway crossing structure, made in accordance with the present invention.
Figure 2:
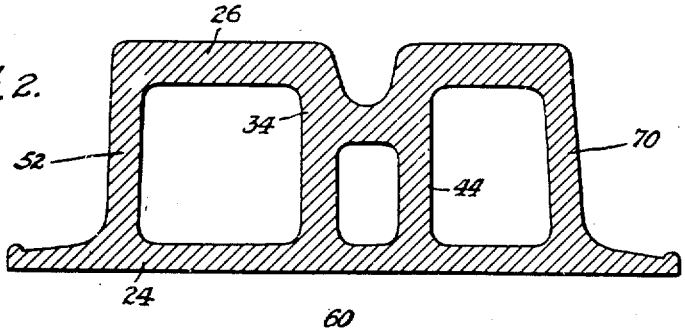
Fig. 2 is a view in cross-section taken in the plane represented by line 2—2 of Fig. 1.
Figure 3:
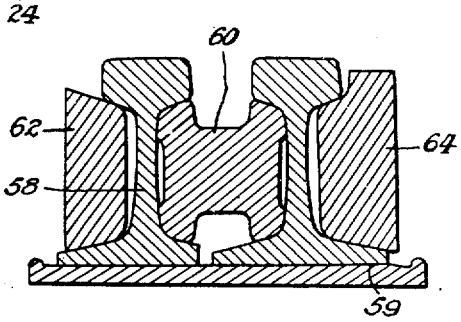
Fig. 3 is a view in cross-section taken in the plane represented by line 3—3 of Fig. 1 of the drawings.
Figure 4:
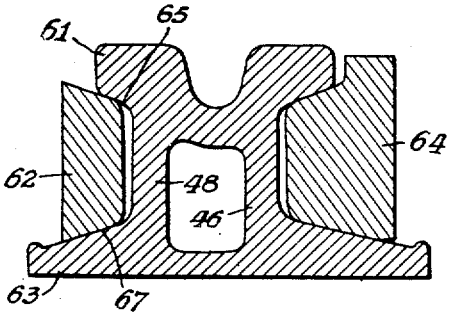
Fig. 4 is a view in cross-section taken in the plane represented by line 4—4 of Fig. 1.
Figure 5:
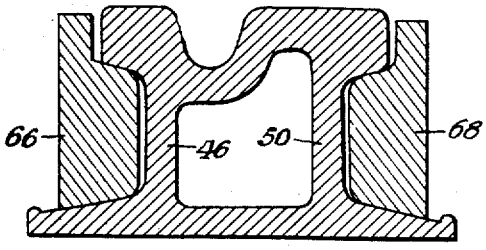
Fig. 5 is a view in cross-section taken in the plane represented by line 5—5 of Fig. 1 of the drawings.

Referring now more in detail to the drawings, a railway crossing structure embodying improvements according to the present invention is shown in part in Figure 1, which includes the two castings 2 and 4 interconnected to one another, as will be later more fully explained, and to a plurality of external rails 6, 8, 10 and 12, the two crossing structures 2 and 4 being further connected to similar elements to form the completed structures of which the drawings are illustrative of one-half thereof. The crossing members 2 and 4 are of like structure and in the further description of the invention reference will be made only to the crossing member 2 and its connection to the external rails 6 and 8. The said crossing structure 2 comprises an integrally formed centrally disposed body portion 14 and the four crossing branches 16, 18, 20 and 22, the branches 16 and 18 being adapted to connect the crossing structure to the external rails 6 and 8, respectively, and the crossing branches 20 and 22 being adapted to connect the crossing structure to other similar crossing structures, one being the crossing structure 4 which is connected to the crossing branch 20 and the other being oppositely disposed in respect to the crossing structure 2 and which is connected to the crossing branch 22.

The said crossing structure embodies a base 24 more clearly in Figures 2 to 5, which is of substantially continuous formation throughout the crossing structure, and an upper bridging web 26 interconnected by means of load sustaining walls or columns generally referred to as 28, of a particular formation as will be hereinafter more fully described. The bridging web 26 is developed to form the intersecting flangeways 30 and 32 by means of downwardly depending ribs 34 which terminate short of the base 24, the said ribs providing the crossing corners 36, 38, 40 and 42.

The diagonally disposed crossing corners 38 and 42 are further developed by the upstanding load sustaining walls 44 and 46 which are disposed substantially beneath the marginal surfaces of the top or upper bridging web 26 defining the flangeways 30 and 32 and serve to interconnect the ribs 34 of said flangeways with the base 24 to more effectively sustain and disperse the wheel loads of trucks passing over the crossing structure.

The other diagonally opposed crossing corners 36 and 40 are developed by the load sustaining walls or columns 28, each of which is provided with a wall portion 48 adjacent the marginal surface of a flangeway, and a portion 50 extending substantially parallel to the other of the flangeways but in spaced relation to the rib defining the same, and which said portions are interconnected by the diagonally disposed wall portion 52 acting as a tie between the adjacent crossing branches. The wall portions 48 interconnect the ribs of the particular flangeway with which the same are associated with the base 24 directly therebeneath, while portions 50 and 52 extending angularly therefrom interconnect the top bridging web 26 with the base 24, thus serving to provide a rigid structure and to distribute loads applied to the crossing.

The diagonally opposed crossing corners 36 and 40 are further developed by the wall portions 54 and 56 intersecting at the said opposed crossing corners and interconnecting the ribs forming the flangeways 30 and 32 to the base 24 directly therebeneath. These wall portions 54 and 56 terminate in spaced relation to the wall portions 48, 50 and 52 and are so disposed beneath the tread surfaces for the flangeways 30 and 32 as to effectively distribute the wheel loads to which the same may be subjected.

It will be noted that the corner 38 is a double gauge point in that it provides a tread surface and a gauge surface for traffic running in the direction of flangeway 30 and also provides a tread surface and a gauge surface for traffic running in the direction of flangeway 32. The diagonal strut or column 70 reinforces the double gauge point 38. The corner 36 is a single gauge point in that it provides a tread surface and a gauge surface for traffic running in the direction of flangeway 30 only. The corner 40 is also a single gauge point in that it provides a tread surface and a gauge surface for traffic running in the direction of flangeway 32 only. The corner 42 which does not receive any wheel treads is the guard point.

It will be noted that ends of the several branch arms 16, 18, 20, 22 are open and that the vertical parallel webs of any branch arm extend generally parallel to their respective flangeway and are unattached to each other except through the bridging web and base; and that the angular corner supports formed by certain webs meeting under the three gauge points 36, 38, 40 and guard point 42 are unattached to each other except through said bridging web and base; and that the diagonal webs which are spaced outwardly of the three gauge points are unattached to each other or to the angular corner supports except through the bridging web and base. It will also be noted that those vertical webs meeting under the double gauge point 38 merge with the vertical webs of adjacent arms and that diagonal web 70 terminates short of these last mentioned webs. This construction provides an intersecting box-girder type crossing in which the vertical webs form interconnected horizontal open tunnels which extend generally lengthwise of the box arms and intersect in the box body. Such arrangement provides a construction which will withstand the severe blows caused by high speed trains with heavy wheel loads and yet is of proper shape for good foundry practice and proper heat treatment.

The crossing is further characterized by the extension of the base 24 of the branches 16 and 18 beyond the bridging web 26 and interconnecting load sustaining webs 28 to provide an effective seat for the said external rails 6 and 8 and to distribute load therefrom to the supporting ties and impact stresses throughout the entire crossing structure. This provision of extending the base in the manner described further prevents the external rails 6 and 8 from cutting into the ties at the joint and provides for a connection which can be kept up by simple maintenance procedures.

The connection between the crossing structure and the external rails 6 and 8 involves the use

243. SWITCHES of a guard rail 58, likewise mounted upon the base extension and maintained in proper spaced relation to the external rail by means of a spreader 60, as more particularly shown in Figure 3 of the drawings. Each of the crossing branches, as more particularly shown in Figures 4 and 5, has its bridging web and base extending laterally of the load sustaining walls forming the box-like structure of the casting, all as shown at 61 and 63 which are provided with the fishing surfaces 65 and 67, respectively, adapted to cooperate with similar fishing surfaces of splice bars such as 62 and 64. The splice bar 62 is adapted to have fishing relation with guard rail 58, while splice bar 64 is adapted to have fishing relation with the external rail to which the branch crossing is connected. As is customary, bolts are provided to draw the splice bars into tight wedging and seating relation with the fishing surfaces described to provide a tight joint. This provides an effective joint from which the truck loads are effectively distributed to the supporting ties, and is of such simplicity as to assure proper maintenance for the purpose of providing tight joints at all times. If desired, that portion of the base upon which the external rails rest may be sloped, as at 59, to facilitate assembly of the crossing and to maintain the joints between said rails and crossing.

While the external rails are connected to the crossing structure in the manner above described, the present invention contemplates a similar connection between adjacently disposed crossing structures, and which more specifically includes the use of splice bars 66 and 68 having fishing or wedging cooperative relation with the laterally extending web and base portion 61 and 63 of the crossing branches of the two adjacent crossing structures. This form of connection likewise provides for the maintenance of a tight joint between the adjacent crossing structures in the completed assembly.

As will be readily appreciated, the crossing branches as herein disclosed are disposed at substantially 90°, but it is to be clearly understood that the crossing structure as exemplified in the drawings may be formed to give any desired angular intersection of the branches to meet the conditions of any disposition of the running or external rails of the track with which the crossing is used.

While there is herein described and upon the drawings shown an illustrative embodiment of the invention, it is to be understood that the invention is not limited thereto but may comprehend other constructions, arrangements of parts, details and features without departing from the spirit of the invention.

What we claim is:

1. A railway crossing structure of substantially the character described, comprising a box-like structure formed with a centrally disposed body portion and a plurality of crossing branches for connection to adjoining running rails, said crossing structure including a base, a top portion in the form of a bridging web, and upstanding webs integrally connecting said base and top portion, said bridging web being formed with intersecting flangeways and tread surfaces, the portions in which the flangeways are formed being developed as downwardly presented ribs terminating short of said base, said crossing structure having diagonally opposed crossing corners developed by said flangeways reinforced by said upstanding webs merging into the ribs of said flangeways, and said crossing structure having other diagonally opposed crossing corners developed by said flangeways reinforced by said upstanding webs merging into the ribs of said flangeways of one of the adjacent crossing branches and reinforced by said upstanding webs disposed in lateral spaced relation to the ribs of said flangeways of the other of the adjacent crossing branches.

2. A railway crossing structure of substantially the character described, comprising a box-like structure formed with a centrally disposed body portion and a plurality of crossing branches for connection to adjoining running rails, said crossing structure including a base, a top portion in the form of a bridging web, and upstanding webs integrally connecting said base and top portion, said bridging web being formed with intersecting flangeways and tread surfaces, the portions in which the flangeways are formed being developed as downwardly presented ribs terminating short of said base, said crossing structure having diagonally opposed crossing corners developed by said flangeways reinforced by said upstanding webs merging into the ribs of said flangeways, and said crossing structure having other diagonally opposed crossing corners developed by said flangeways reinforced by said upstanding webs in spaced relation to said crossing corners.

3. A railway crossing structure as described in claim 2, in which said upstanding webs of said last-named crossing corners merge with the ribs of said flangeways of one of the adjacent crossing branches and are disposed in spaced relation to the ribs of said flangeways of the other of the adjacent crossing branches.

4. A railway crossing structure as described in claim 2, in which the crossing structure has the other diagonally opposed crossing corners developed by the flangeways reinforced by upstanding webs merging with the ribs of said flangeways but spaced from said first-named upstanding webs.

5. A railway crossing structure as described in claim 2, in which said upstanding webs of said last-named crossing corners extend diagonally between the adjacent crossing branches and merge at one end with the ribs of said flangeways of one of the adjacent crossing branches and are disposed in spaced relation at the other end to the ribs of said flangeways of the other of the adjacent crossing branches.

6. A railway crossing structure as described in claim 2, in which said upstanding webs of said last-named crossing corners extend diagonally between the adjacent crossing branches and merge at one end with the ribs of said flangeways of one of the adjacent crossing branches and are disposed in spaced relation at the other end to the ribs of said flangeways of the other of the adjacent crossing branches, and in which the crossing structure has the other diagonally opposed crossing corners developed by the flangeways reinforced by upstanding webs merging with the ribs of said flangeways but spaced from said first-named upstanding webs.

7. A railway crossing structure as described in claim 2, in which said upstanding webs of said last-named crossing corners extend diagonally between the adjacent crossing branches and merge at one end with the ribs of said flangeways of one of the adjacent crossing branches and are disposed in spaced relation at the other end to the ribs of said flangeways of the other of the adjacent crossing branches, and in which the crossing structure has the other diagonally opposed crossing corners developed by the flangeways reinforced by upstanding webs merging with the ribs of said flangeways but spaced from said first-named upstanding webs in substantially opposed relation to the diagonally disposed portion of said first-named upstanding webs.

8. A railway crossing structure of substantially the character described, comprising a box-like structure formed with a centrally disposed body portion and a plurality of crossing branches, said crossing structure including a substantially continuous base throughout the crossing structure, a top portion in the form of a bridge web, upstanding webs integrally connecting said base and top portion, said bridging web being formed with intersecting flangeways and tread surfaces, the portions in which the flangeways are formed being developed as downwardly presented ribs terminating short of said base, and certain of said crossing branches having their base extending beyond the top portion and upstanding webs therefor to provide for seating relation with external rails.

9. A railway crossing structure as described in claim 8, in which splice bars having fishing relation with fishing surfaces provided on said branches and external rails are provided for securing the same together.

10. A railway crossing structure as described in claim 8, in which the external rail assemblies include a guard rail, and in which splice bars having fishing relation with fishing surfaces on said branches and rails are provided for securing the same together.

11. A railway crossing structure as described in claim 1, in which the base of said crossing branches extends beyond the top portion and upstanding webs therefor to provide for seating relation with external rails.

12. A railway crossing structure as described in claim 2, in which the base of certain of said crossing branches extends beyond the top portion and upstanding webs therefor to provide for seating relation with external rails.

13. A railway crossing of intersecting box-girder form having a centrally disposed box body and four projecting box arms, said crossing comprising a top bridging web, a base and vertical webs connecting said bridging web and base, said bridging web having intersecting flangeways forming a double gauge point and two single gauge points, the vertical webs of each box arm extending from the end of arm to said box body, inner vertical webs of said box body being disposed under said three gauge points to form corner supports, outer vertical webs of said box body being disposed in outwardly spaced relation to said three gauge points and extending across corresponding corners of the crossing, the vertical webs of each box arm merging with corresponding vertical webs of said box body, said vertical webs being generally unattached to other vertical webs spaced laterally outwardly or inwardly therefrom, except through said bridging web and base, thereby forming a plurality of horizontally extending, open interconnected tunnels located between the several laterally spaced vertical webs, said tunnels extending generally lengthwise of the box arms and intersecting in the box body.

14. A railway crossing of intersecting box-girder form having a centrally disposed box body and four projecting box arms, said crossing comprising a top bridging web, a base and vertical webs connecting said bridging web and base, said bridging web having intersecting flangeways forming a double gauge point and two single gauge points, the vertical webs of any box arm extending from the end of the arm to said box body, certain vertical webs of said box body meeting under said three gauge points to form three separate angular corner supports unattached to each other except through said bridging web and base, certain vertical webs of said box body being disposed in outwardly spaced relation to said three gauge points and extending across the corresponding corners of the crossing and unattached to said angular corner supports except through said bridging web and base, the vertical webs of each box arm merging with corresponding vertical webs of said box body.

15. A railway crossing of intersecting box-girder form having a centrally disposed box body and four projecting box arms, said crossing comprising a top bridging web, a base and vertical webs connecting said bridging web and base, said bridging web having intersecting flangeways forming a double gauge point, two single gauge points, and a guard point, the vertical webs of any box arm extending from the end of the arm to said box body and unattached to each other except through said bridging web and base, certain vertical webs of said box body meeting under said three gauge points to form three separate angular corner supports unattached to each other except through said bridging web and base, certain vertical webs of said body being disposed in outwardly spaced relation to said three gauge points and extending diagonally across the corresponding corners of the crossing and unattached to each other or to said angular corner supports except through said bridging web and base, vertical webs of adjacent arms whose flangeways form said guard point merging with each other, other vertical webs of said box arms merging with corresponding vertical webs of said box body.

16. A railway crossing of intersecting box-girder form having a centrally disposed box body and four projecting box arms, said crossing comprising a top bridging web, a base and vertical webs connecting said bridging web and base, said bridging web having intersecting flangeways forming a double gauge point and two single gauge points, the vertical webs of any branch arm being disposed generally parallel to their respective flangeway and unattached to each other except through said bridging web and base, certain of said vertical webs meeting under said three gauge points to form three separate angular corner supports unattached to each other except through said bridging web and base, certain vertical webs of said body being disposed in outwardly spaced relation to said three gauge points and extending diagonally across the corresponding corners of the crossing and unattached to each other or to said angular corner supports except through said bridging web and base, those vertical webs meeting under said double gauge point merging with the vertical webs of adjacent arms, the diagonal web at said double gauge point terminating short of said last mentioned merged webs.

JOHN V. HOUSTON.
BERGER R. HABEL.